US006876293B2

(12) United States Patent
Frolov et al.

(10) Patent No.: US 6,876,293 B2
(45) Date of Patent: Apr. 5, 2005

(54) MULTIPLE ACCESS ELECTRONIC LOCK SYSTEM

(75) Inventors: George Frolov, Farmington, CT (US); Gary E. Lavelle, Avon, CT (US); Leon Boiucaner, Farmington, CT (US); Michael Cote, Plainville, CT (US); Dominic Pesapane, Cheshire, CT (US)

(73) Assignee: Harrow Products, LLC, Montvale, NJ (US)

(*) Notice: Subject to any disclaimer, the term of this patent is extended or adjusted under 35 U.S.C. 154(b) by 0 days.

(21) Appl. No.: 10/337,148

(22) Filed: Jan. 6, 2003

(65) Prior Publication Data

US 2003/0132829 A1 Jul. 17, 2003

Related U.S. Application Data

(63) Continuation of application No. 09/286,348, filed on Apr. 5, 1999, now abandoned.

(60) Provisional application No. 60/080,693, filed on Apr. 3, 1998.

(51) Int. Cl.[7] .................................................. H04Q 1/00

(52) U.S. Cl. ......................... 340/5.7; 340/5.6; 340/542; 340/5.54; 70/278.2

(58) Field of Search ......................... 340/5.1, 5.2, 5.54, 340/5.6, 5.61, 5.62, 5.65, 5.66, 5.58, 542; 70/278.2

(56) References Cited

U.S. PATENT DOCUMENTS

| | | | | | |
|---|---|---|---|---|---|
| 4,677,284 | A | * | 6/1987 | Genest | 340/5.6 |
| 5,083,122 | A | * | 1/1992 | Clark | 340/5.7 |
| 5,479,151 | A | * | 12/1995 | Lavelle et al. | 340/542 |
| 5,602,536 | A | * | 2/1997 | Henderson et al. | 340/5.23 |
| 5,749,253 | A | * | 5/1998 | Glick et al. | 70/278.2 |
| 5,841,361 | A | * | 11/1998 | Hoffman | 340/5.54 |
| 5,847,656 | A | * | 12/1998 | Dawson et al. | 340/5.55 |
| 5,896,095 | A | * | 4/1999 | Hill et al. | 340/5.2 |
| 5,923,264 | A | * | 7/1999 | Lavelle et al. | 340/5.64 |
| 6,130,621 | A | * | 10/2000 | Weiss | 340/5.28 |
| 6,298,147 | B1 | * | 10/2001 | Ilan et al. | 340/5.7 |

* cited by examiner

*Primary Examiner*—Brian Zimmerman
(74) *Attorney, Agent, or Firm*—Michael Best & Friedrich, LLP

(57) ABSTRACT

An electronic door security system employs an input console having three readers for enhanced security. A microprocessor processes inputs applied at each of the readers to selectively permit access through a secured door. Application of an input to any of the readers transforms the controller from a sleep mode to an active mode.

10 Claims, 6 Drawing Sheets

MULTIPLE ACCESS ELECTRONIC LOCK SYSTEM

CROSS-REFERENCE TO RELATED APPLICATION

This application is a continuation of U.S. patent application Ser. No. 09/286,348 filed Apr. 5, 1999 now abandoned, which claims the priority of U.S. Provisional Patent Application No. 60/080,693 filed on Apr. 3, 1998.

BACKGROUND OF THE INVENTION

This invention relates to the field of electronic door locks. More particularly, this invention relates to a multiple reader stand-alone door lock system for securing a door.

It is known in the field of electronic door locks to use a stand-alone electrically controlled lock to secure the door to a door frame. Such locks typically employ a system that compares stored valid user codes to an access code which is entered by a person seeking entry to the secured area. Such access code systems have generally used a single code reader device, such as a keypad or a card reader, for receiving the access code.

Electrically controlled door locks have found acceptance in business and university settings. For example, a door lock system may secure a dormitory room. Each resident of the room is issued an individual valid access code for the particular lock that secures their room. For safety and maintenance reasons, it is also required that the security and maintenance departments be able to access the dormitory rooms. Therefore, personnel from these departments are issued access codes for the door locks. Due to the large number of secured doors at a university, it is generally required that a single universal code be available to the safety and maintenance personnel to permit entry to large blocks of secured doors. Consequently, unauthorized personnel can gain entry to a large number of secured areas if the universal code is compromised.

To better control and monitor access to the secured areas, it is generally preferred that the individual security and maintenance personnel each be assigned a unique universal code. As a consequence, an individual door lock system will unlock not only for residents of the dormitory room, but also for a large number of additional universal codes. The greater the number of valid codes for a particular doorway, the greater the possibility that random entry of access codes will release the lock. When a universal code has been compromised, all the doors within a block or on the system must be individually reprogrammed to delete the old universal code and enter a new universal code.

SUMMARY OF THE INVENTION

Briefly stated, the invention in a preferred form relates to a multiple access stand-alone electronic door lock assembly. The electronic lock assembly preferably mounts to a door having a latch which may be actuated by a handle or knob at either side of the door. The interior door handle typically actuates to release the latch under all circumstances. An electrically operated locking mechanism permits selective operation of the latch via the exterior door handle.

The electronic lock assembly comprises a lock controller and multiple access code readers. The lock controller and the access code readers are powered from an on-board power source, such as a battery source. The lock controller is programmable and has an associated memory. The memory stores valid access codes for comparison with access codes entered into one of the readers.

One of the readers is preferably a keypad. The keypad receives personal access codes. The second reader is an electronic touch entry key reader, such as a card reader. The third reader is an electronic magnetic strip reader. A computer data port for programming the lock controller or downloading audit trail information is also provided. The lock controller compares an entered user access code from one or more of the readers to corresponding valid user access codes stored in the lock controller memory. An appropriate comparison causes the lock controller to generate a signal to the locking mechanism that places the door in an unlocked state.

In one preferred application for security systems having a large number of secured doors, such as a dormitory at a university setting, a student would be provided with either a card carrying a magnetic strip containing an access code or a personal access code for entry at the keypad for the assigned dormitory room. Security and maintenance personnel could obtain entry to blocks of rooms by use of the appropriate programmable data key. If an individual student's personal access code is compromised, only a single or a small number of locks require reprogramming with a new code in order to reestablish a secure environment. Any possible unauthorized entries would be restricted to a small number of secured areas. The small number of electronic keys held by security or maintenance personnel reduces the possibility of unauthorized entry.

The door lock system further embodies power saving functions for the on-board battery power supply to permit extended operation of the door lock system. In particular, the lock controller has two operational modes, a sleep mode and an active mode. When the lock system is in the sleep mode, the lock system components place a minimal current draw on the battery source. Contact with the keypad, the electronic key reader device or the magnetic strip reader device transforms the lock controller from the sleep mode to the active mode. In the active mode, the lock controller scans the readers for an access code, processes the electronic inputs, generates various lock commands, and records appropriate data. A low current motor is employed in the locking mechanism to further conserve battery power.

An object of the invention is to provide a new and improved electronic door security system having enhanced security features.

Another object of the invention is to provide a new and improved electronic door security system which employs three different readers for obtaining access to a secured area.

A further object of the invention is to provide a new and improved electronic door security system which incorporates a keypad, an electronic key reader, and an electronic magnetic strip reader.

Other objects and advantages of the invention will become apparent from the drawings and the specification.

DETAILED DESCRIPTION OF THE PREFERRED EMBODIMENT

Figure 1:
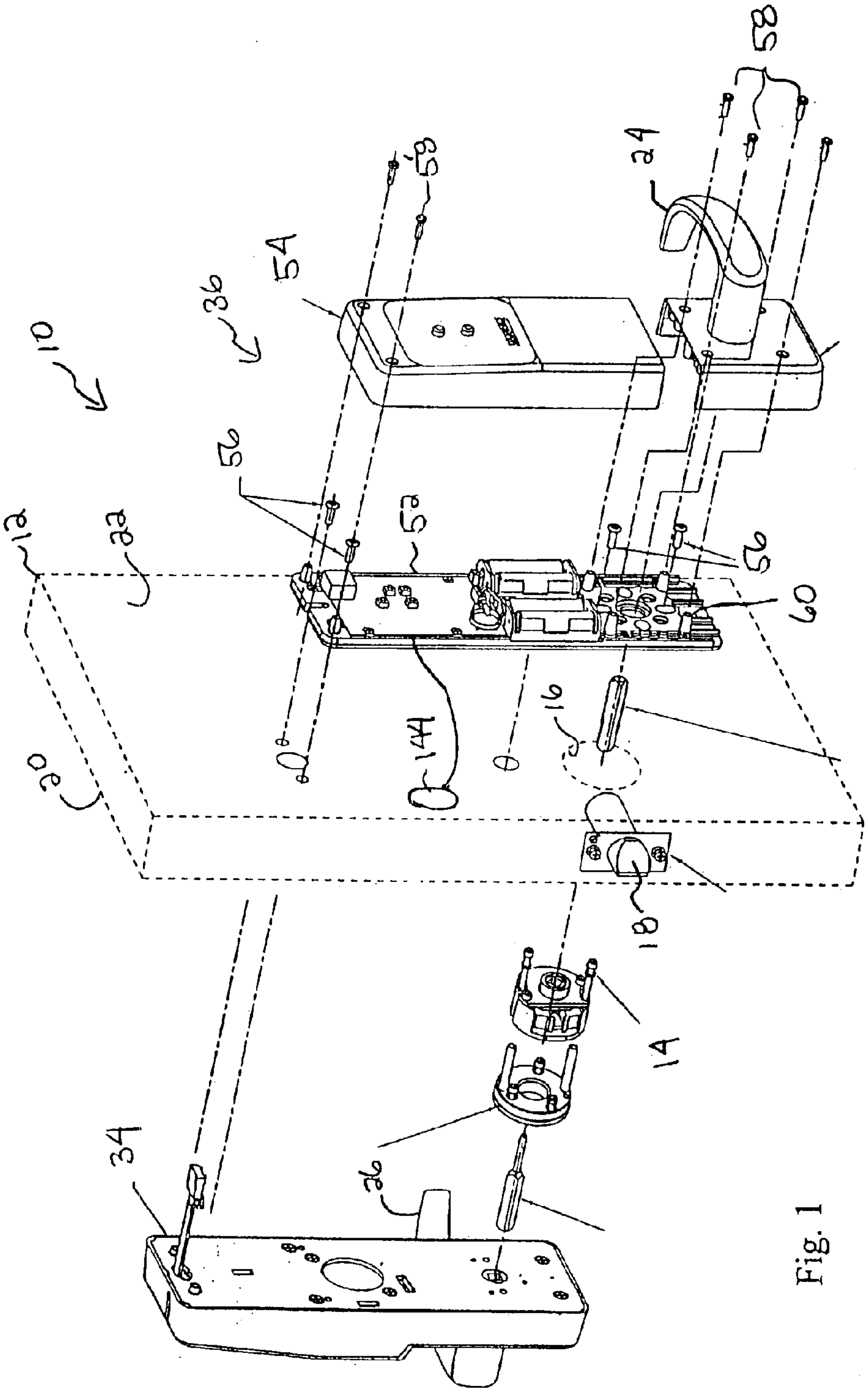
FIG. 1 is an exploded isometric view, partly broken away and partly in schematic, of an electronic lock assembly in accordance with the present invention in association with a portion of a door, and a first latch assembly.

With reference to the drawings wherein like numerals represent like parts and steps throughout the Figures, an electronic lock assembly in accordance with the present invention is generally designated by the numeral 10. The electronic lock assembly 10 is adapted for mounting to a door 12 (FIG. 1). An electrically actuated lock 14 is mounted in a throughbore 16 in the door 12. The lock 14 secures the door 12 via a latch 18 which engages a strike mounted to the door frame (not shown). For purposes of illustration, the door 12 has a secured or exterior side 20 and an unsecured or interior side 22. The latch 18 is actuatable from either side of the door 12 by an interior handle 24 and an exterior handle 26. The handles 24, 26 may assume various forms including levers, as illustrated, knobs or other well-known door hardware.

The electronic lock assembly 10 has applications for a wide variety of doorway and lock set configurations including installations for mortise locks 28 (FIG. 3), cylinder locks 14 and other electrically controlled lock assemblies. The interior handle 24 is preferably free to release the latch 18 under all circumstances. An electrically controlled motorized drive unit 30 includes a motor 32, as shown in FIG. 4, for operating the lock to selectively secure the latch 18 and thereby prevent the exterior handle 26 from actuating the latch 18 for release.

Figure 2:
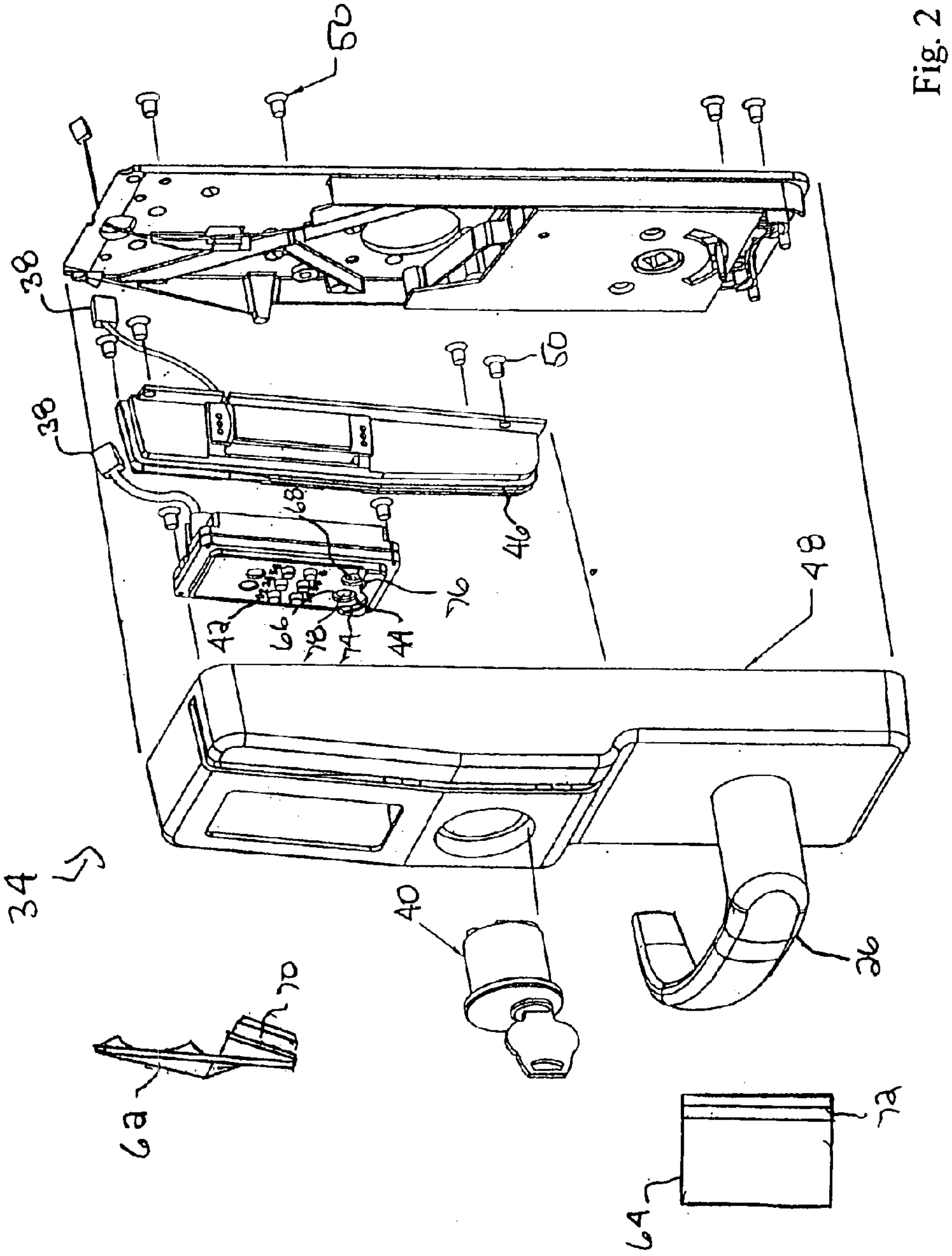
FIG. 2 is an exploded isometric view of a portion of the electronic lock assembly of FIG. 1.
Figure 3:
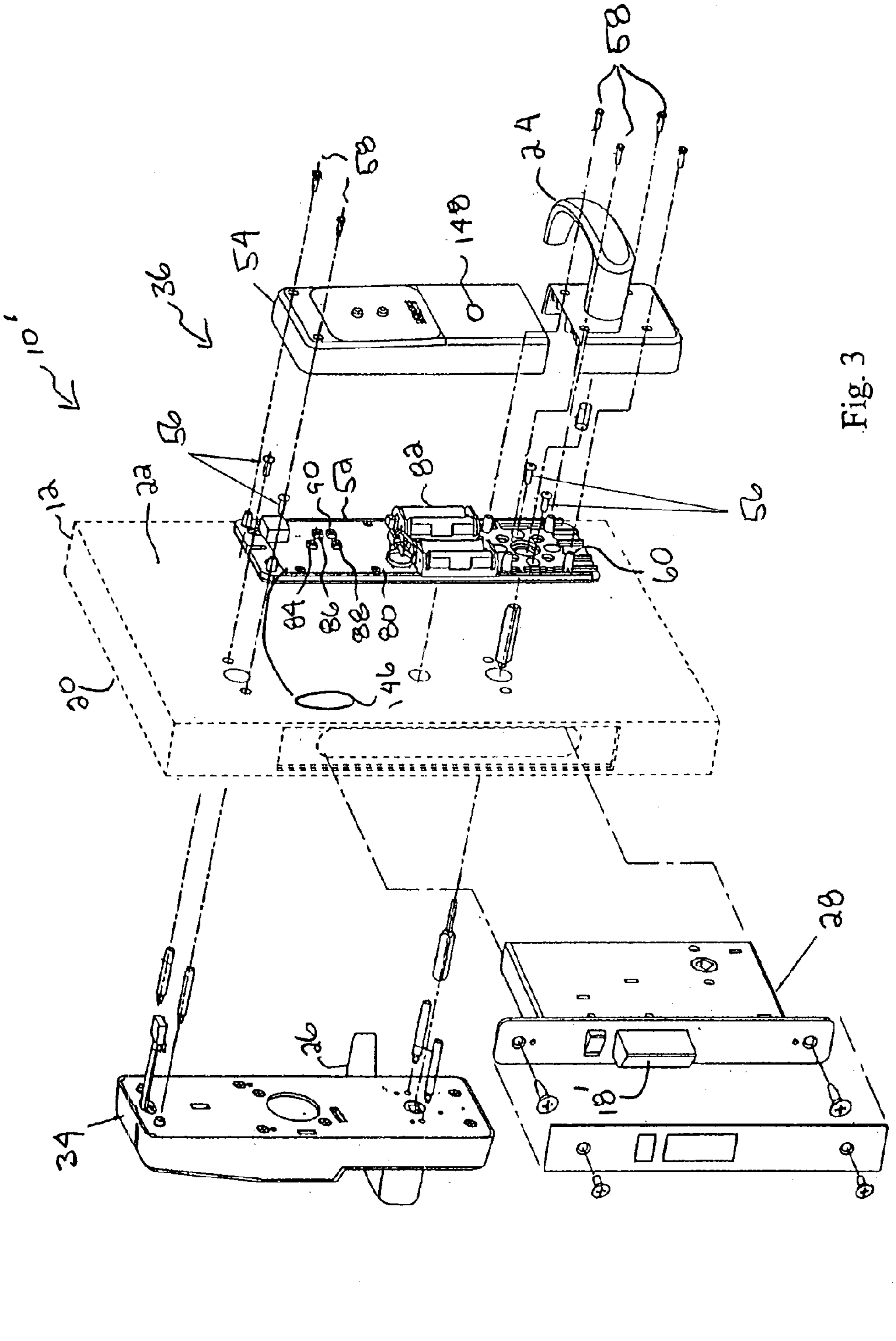
FIG. 3 is an exploded isometric view, partly broken away and partly in schematic, of the electronic lock assembly of FIG. 1 in association with a portion of a door, and a second latch assembly.
Figure 4:
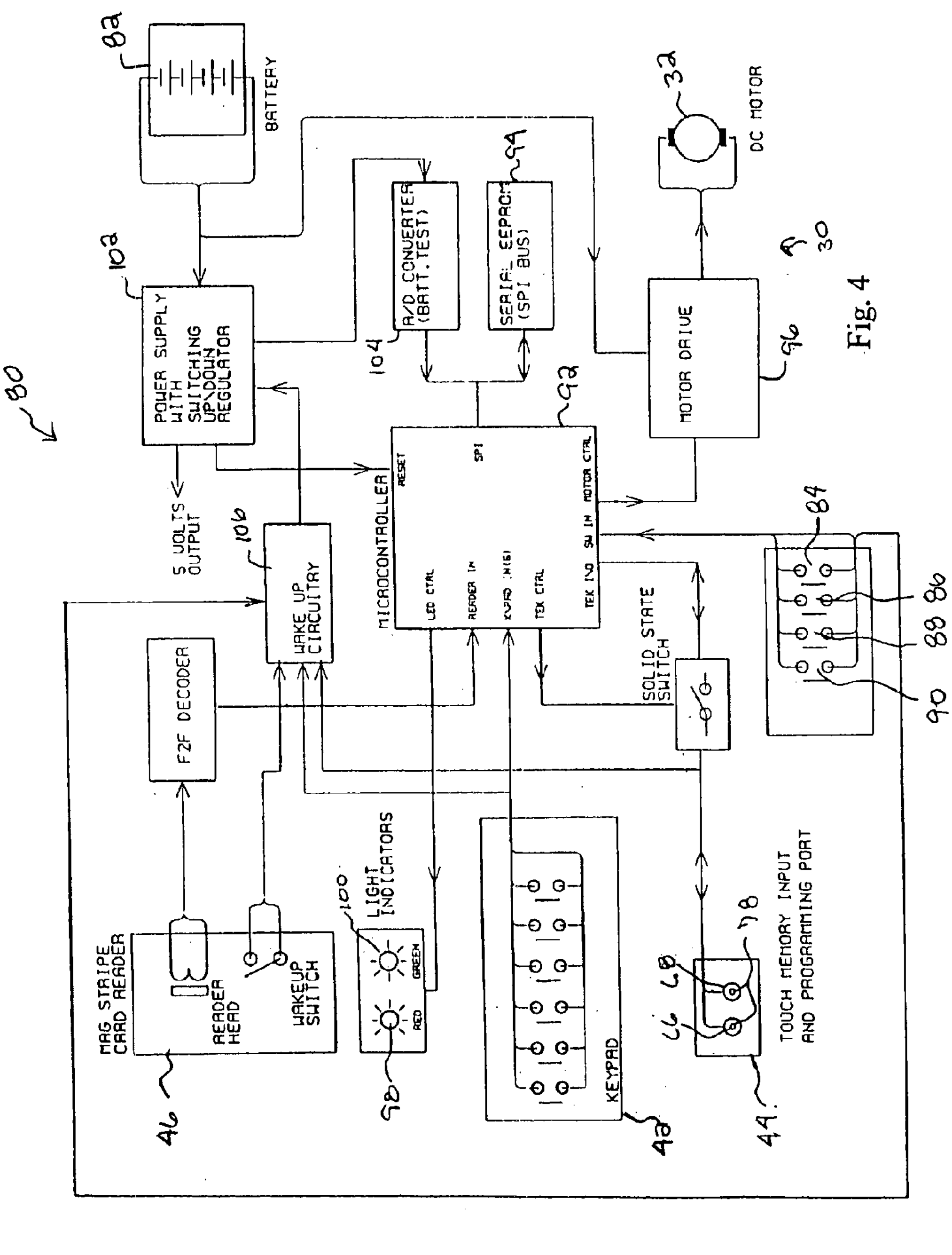
FIG. 4 is a schematic block diagram of the electronic lock assembly of FIG. 1.

With reference to FIGS. 1, 2 and 3, the electronic lock assembly 10 comprises an exterior subassembly 34 which mounts against the exterior side 20 of the door 12 and a cooperative interior subassembly 36 which mounts against the interior side 22 of the door 12. Communication wires 38 carry electrical signals between the exterior subassembly 34 and the interior subassembly 36. A key operated lock cylinder 40 mounted in the exterior subassembly 34 provides a means of mechanically overriding the electronic lock controls described below.

With reference to FIG. 2, the exterior subassembly 34 includes an input console which incorporates three (3) different types of access code readers 42, 44, 46, as explained below. The access code readers 42, 44, 46 are supported within a case 48 constructed of a tamper resistant material which is fastened to the door 12 by conventional fasteners 50. Anti-tamper plugs (not shown) may be mounted over the fasteners 50 to prevent unauthorized removal of the exterior subassembly 34 from the door 12. With reference to FIGS. 1 and 3, the interior subassembly 36 has a mounting plate 52 and a cover 54. The mounting plate 52 is secured to the interior side 22 of the door 12 by fasteners 56, preferably wood screws. The cover 54 is mounted to the mounting plate 52 by screws 58 threadably engaging the studs 60 affixed to the mounting plate 52.

The access code readers preferably include an externally accessible keypad 42, a contact activatable reader 44 for electronically reading data stored in a programmable data key (TEK) 62, such as a Locknectics TouchEntry™ data key, and a contact activatable reader 46 for reading data stored on a magnetic strip 72 which is carried on the edge portion of a card 64 (mag card). The apparatus and method for storing data on a data key or in a magnetic strip is well known in the industry.

The data key reader 44 (FIG. 2) includes first and second contacts 66, 68 for contacting a ROM chip 70 carried on the data key 62 and providing a signal path therebetween. The first contact 66 defines a horizontal conducting surface which contacts with the generally planar surface of the bottom of a first type of ROM chip 70 which is typically carried on a data key 62. The second contact 68 defines a vertical conducting surface on the side of the contact 68 for contacting a second type of ROM chip 70 which is typically carried on a data key 62. A first locating shoulder 74 is coaxial with the first contact 66 has a radius substantially equal to the radius of the first type of ROM chip 70 and a second shoulder 76 is coaxially positioned around the second contact 68 and has a radius substantially equal to that of the outer radius of the second type of ROM chip 70. The shoulders 74, 76 locate the respective ROM chip 70 in conducting contact with the conducting surface of the contact 66, 68.

Each contact 66, 68 defines a corresponding jack opening 78 for receiving male plug-in jacks from a computer. The conducting surfaces of the first and second contacts 66, 68 are conductively connected to the computer jack opening 78. Consequently, the data key reader 44 accepts not only access code input through the contact activatable dataport, but also functions as a communication port to facilitate programming of the electronic lock assembly 10 and downloading audit trail data via a computer.

The mounting plate 52 of the interior subassembly 36 supports a lock controller 80, a power source 82, and four pushbuttons 84, 86, 88, 90. The power source 82 for the electronic lock assembly 10 is a set of batteries mounted to the mounting plate 52 by battery holders. The lock (LOCK) 84, unlock (UNLOCK) 86, clear memory (CLR MEM) 88 and initiate program (INIT PROG) 90 push buttons provide signals which are received by the lock controller 80 as explained below. Generally, the cover 54 of the interior subassembly 36 must be removed to provide access to the pushbuttons 84, 86, 88, 90. The lock assembly 10 commonly includes an optional "privacy" mode that is initiated by the LOCK button 84, as explained below. In a lock assembly 10 having the privacy mode, the LOCK button 84 is accessible through the cover 54 to facilitate initiation of the privacy function.

With reference to FIG. 4, the lock controller 80 is a programmable microprocessor driven system for controlling the lock via the electrical motorized drive unit 30 in response to access codes and computer commands entered at the readers 42, 44, 46. The lock controller 80 comprises a microprocessor 92, such as, for example, a Motorola 68HC705C9 microprocessor. The microprocessor 92 has an on-board memory 94 which can be programmed to store valid access codes and audit trail data. A real-time clock communicates with the microprocessor 92 to record the chronological history of each attempted lock/unlock event, including each mechanical key override, and the associated access code entered.

The microprocessor 92 receives personal access codes and universal access codes from the readers 42, 44, 46 and compares those access codes to corresponding valid access codes stored in the memory 94. If correspondence is found between an entered access code and a valid access code stored in the memory 94, the microprocessor 92 sends a release signal to the drive unit 30 which actuates the low current motor 32 through a bidirectional motor driver 96 to place the lock in an unlocked state. The microprocessor 92 also generates signals to the LED indicators 98, 100 indicative of lock status.

An important consideration for the stand-alone lock systems is low power consumption in order to obtain long battery life. The microprocessor 92 and other associated electronic components of the electronic lock assembly 10 are powered through a power supply circuit and power control 102 and an A/D converter 104. In order to conserve battery power, the microprocessor 92 has two operational modes. The first passive mode, which is the normal state for the system, is a sleep mode wherein the microprocessor 92 and other components of the system draw a minimal current from the batteries. Each of the readers 42, 44, 46 and each of the push buttons 84, 86, 88, 90 provides an input to the "wake-up" circuitry 106 of the lock controller 80. Upon the initial attempt to enter an input in one of the readers 42, 44, 46 or upon pressing one of the push buttons 84, 86, 88, 90, the system powers up to an active mode in order to perform the lock and security functions. Power is further conserved by using a low current motor 32 of the drive unit for the lock 14.

Figure 5A:
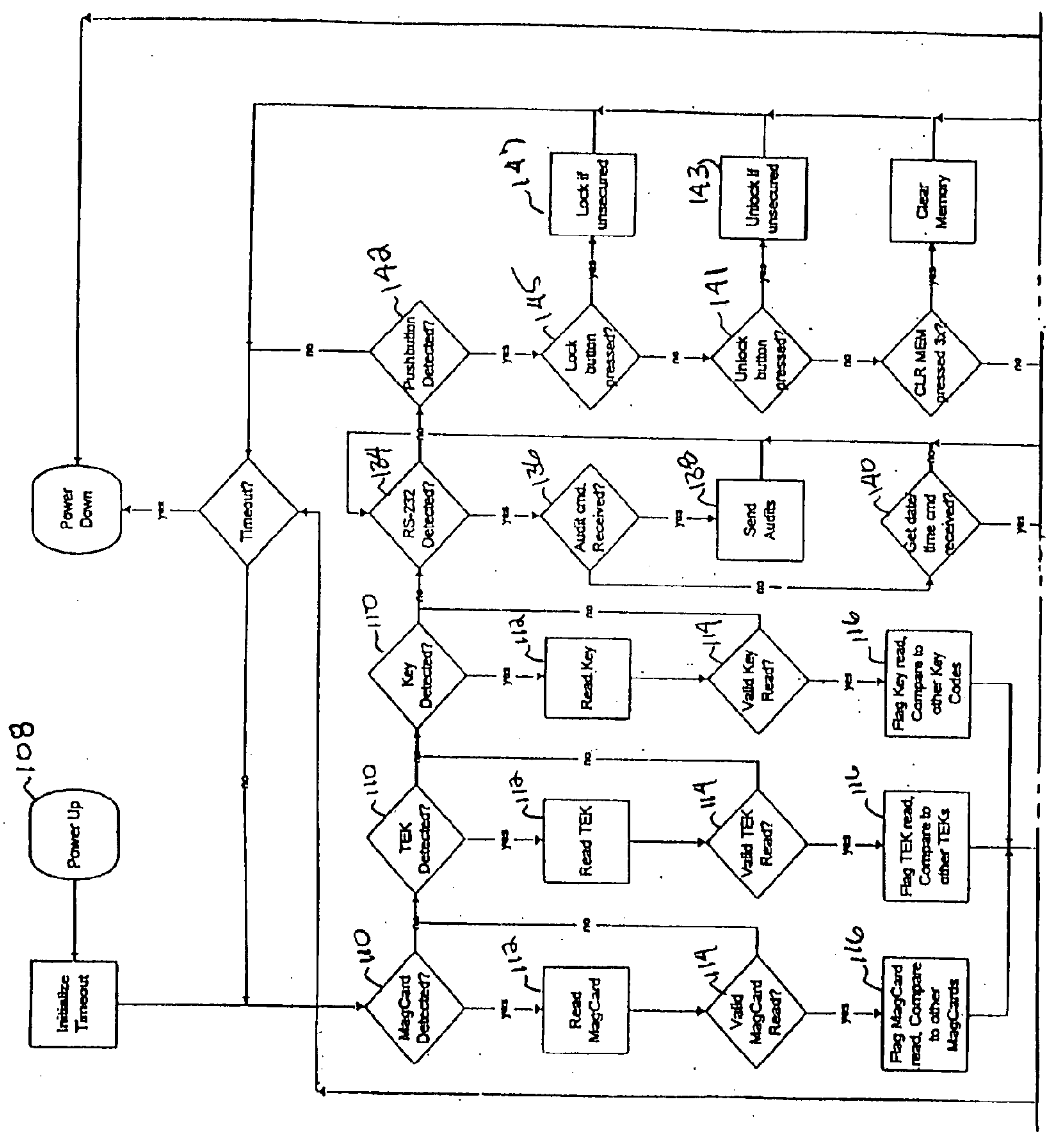
FIGS. 5*a* and 5*b* are a flow diagram of the main operating routine of the electronic lock system of FIG. 1.
Figure 5B:
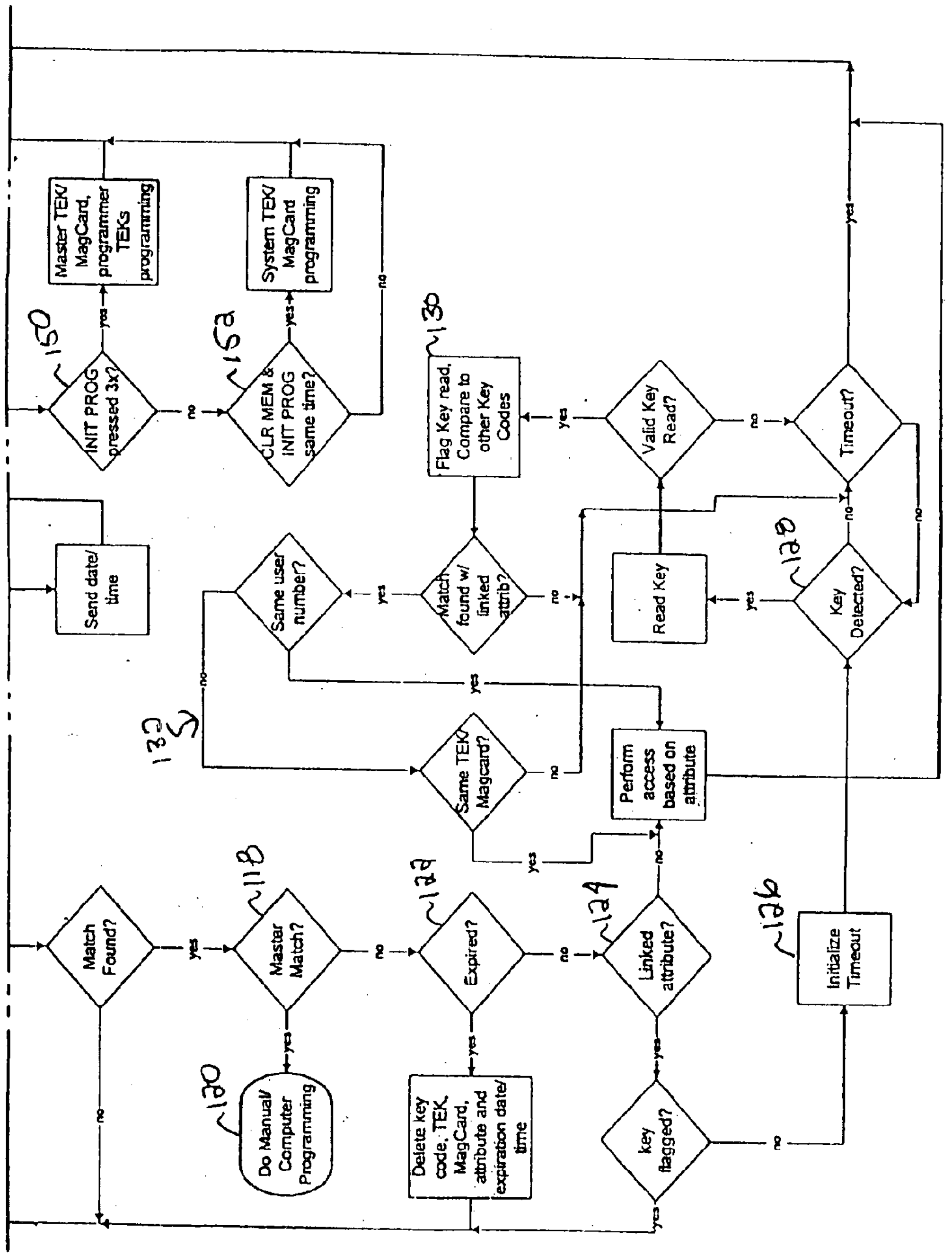

The processing steps are illustrated by the flow diagram of FIGS. 5*a* and 5*b* wherein certain steps are numerically identified. An initial contact at any of the readers 42, 44, 46, push buttons 84, 86, 88, 90 or the communications port 78 generates a power-up command 108 and the lock controller 80 is initialized. Typically, the lock controller 80 is initialized by 1) initializing the individual input/output (I/O) ports; 2) initializing and starting the computer operating properly (COP) timer; 3) setting the option register for extra RAM; 4) initializing the keypad 42; 5) reading the type of master from the memory 94 and flagging same; 6) determining the presence of audit trail data (ATR) and flagging same; and 7) reading the lock electrostatic discharge (ESD) from the memory 94, locking the door if the value indicates the unlocked, and resetting the value to indicate the locked status.

The microprocessor 92 determines whether the mag card reader 46, the data key reader 44, the keypad 42, the communications port 78, the LOCK button 84, the UNLOCK button 86, the CLR MEM button 88, or the INIT PROG button 90 was responsible for initiating the power-up command. If the microprocessor detects 110 the presence of a mag card 64 or a data key 62 or the closure of a key on the keypad 42, the microprocessor reads the data 112 stored on the mag card 64 or the data key 62 or entered at the keypad 42 and performs a validation check 114 to determine whether the mag card 64 or data key 62 is valid or that the code entered at the keypad 42 is valid In the event that a key closure has occurred, a counter counts the number of keys that are pressed. If forty (40) keys are pressed without the entry of a code matching a valid code stored in the memory 94, the microprocessor 92 locks out the keypad 42. Allowing five (5) seconds to pass without pressing a key, or activating any of the other inputs, causes the microprocessor 92 to timeout and power-down to the sleep mode, erasing the keypad buffer and resetting the counter. If an entry code is entered at the keypad 42, the code entered at the keypad 42 is compared 116 to a list of valid codes stored in the memory.

In the event a data key 62 is detected 110, the microprocessor 92 executes a subroutine to read the data 112 stored on the data key 62. The microprocessor 92 generates a serial binary command signal to read key identification information and to accept data from the key 62 within a pre-established time slot. The microprocessor 92 then validates 114 the data key 62. The microprocessor 92 calculates the cyclic redundancy check (CRC) and compares it to the CRC read from the data key 62. If the calculated CRC does not match the CRC read from the data key 62, the read data is discarded and the data key 62 is ignored. If the calculated CRC matches the CRC read from the data key 62, the key identification information read from the data key 62 is compared to key identification information stored in the memory 94. If the stored key identification information does not match the key identification information read from the data key 62, the read data is discarded and the data key 62 is ignored. If the comparison is positive, that is the stored key identification information matches the key identification information read from the data key 62, the code read from the data key is compared 116 to a list of valid codes stored in the memory.

In the event a mag card 64 is detected 110, the microprocessor 92 executes a subroutine to read the data 112 stored on the mag card 64. The microprocessor 92 generates a serial binary command signal to accept data from the card within a pre-established time slot. The microprocessor calculates the longitudinal redundancy check (LRC) and compares 114 the calculated value to the LRC read from the mag card 64. If the calculated LRC does not match the LRC read from the mag card 64, the read data is discarded and the mag card 64 is ignored. If the calculated LRC matches the LRC read from the mag card 64, the data read from the mag card is compared to the master mag card stored in the memory. If the comparison is positive, that is the read data matches the stored master mag card, the data is not masked. If the read data does not match the stored master mag card, the read data is masked according to the mask stored in the memory, to eliminate data that is not required to operate the lock, and then the masked data is compared 116 to valid mag card data stored in the memory.

After the microprocessor 92 verifies that the code entered at the keypad 42 or by a data key 62 or mag card 64 matches a valid code, the microprocessor 92 verifies 118 that the code is not a master code, which is used to allow access to the microcomputer for programming purposes 120. If the code is not a master code, the microprocessor verifies 122 that the code has not expired. The codes which are entered at the keypad 42 or by a data key 62 or a mag card 64 can be set to expire, either on a calendar date or after a set number of uses. This feature provides the flexibility of limiting the access of specific security or maintenance personnel or limiting the access of all security or maintenance personnel to a specific secured area.

If the code has not expired, the microprocessor 92 determines 124 whether the code provided by the data key 62 or mag card 64 is sufficient to actuate operation of the lock or whether a linked attribute, such as a personal identification number (PIN), must also be entered at the keypad 42. If a linked attribute is not required, a release signal is generated to the drive unit 30 for releasing the latch. If a linked attribute is required, the microprocessor initializes a timeout 126, providing an upper limit on the time in which the PIN may be entered, and queries 128 the keypad to see if the PIN has been entered. If a PIN is not detected within the time limit set by the timeout, the data is discarded and the data key 62 or mag card 64 is ignored. If a PIN is detected, the PIN is compared 130 to valid codes stored in the memory 94. If the PIN does not match a stored code number, the data is discarded and the data key 62 or mag card 64 is ignored.

It is quite common for a number of students to share a room in a college dormitory. Generally, the mag card 64 assigned to each person sharing the room will contain identical code numbers. However, each person assigned to the room will be signed a unique PIN. Consequently, the microprocessor 92 must verify 132 that the PIN/mag card combination is a member of the set of combinations that is assigned to the occupants of the room. If the combination is a member of this set, a release signal is generated to the drive unit for releasing the latch.

Should neither a key closure, a data key 62, nor a mag card 64 be detected, the microprocessor executes a test 134 to determine if a computer is connected. When a computer is connected, the microprocessor 62 queries 136 the computer for an audit command. If the audit command is received, the microprocessor transmits 138 the audit trail report to the computer and logs 140 the time and date of receipt of the audit command. If an audit command is not received, the microprocessor 92 queries the computer for data. The computer may be used to update the list of valid codes stored in the memory. During external programming, all previously stored valid codes are deleted and the new codes are added to the memory. External programming may also be used to reset the date and time and to set/reset relock, nuisance and door propped delay times.

The microprocessor 92 may also be manually programmed 120. A master code entered at the keypad 42 or a master data key 62 or master mag card 64 initiates manual programming. A code number is entered to designate whether the manual programming is to change users, add users, delete users, change the master, change user and function, add user and function, delete a user, revise the firmware, program the relock delay, program system data keys or system mag cards, or program programmer data keys. The appropriate data is then added, deleted or revised. Tables 1a, 1b and 1c provide a listing of the function codes that may be used during manual programming.

TABLE 1a

| Function Code | Day/Night-Relay Code | Release Mode | Code Type | Actual Function |
|---|---|---|---|---|
| 111 | N/A | Default Delay[7] | Normal | Default release |
| 113 | N/A | Default Delay | One use | One-use default release |
| 115 | N/A | Default Delay | Lockout | Lockout |
| 117 | N/A | Default Delay | Double | Double default release |
| 119 | N/A | Default Delay | Normal | Default release |
| 131 | N/A | Default Delay | Normal | Default release |
| 133 | N/A | Default Delay | One use | One-use default release |
| 135 | N/A | Default Delay | Lockout | Lockout |
| 137 | N/A | Default Delay | Double | Double default release |
| 139 | N/A | Default Delay | Normal | Default release |
| 151 | N/A | Alt. Delay #1' | Normal | Alt. Delay #1 release |
| 153 | N/A | Alt. Delay #1 | One use | One-use Alt. Delay #1 release |
| 155 | N/A | Alt. Delay #1 | Lockout | Lockout |
| 157 | N/A | Alt. Delay #1 | Double | Double Alt. Delay #1 release |
| 159 | N/A | Alt. Delay #1 | Normal | Alt. Delay #1 release |
| 171 | N/A | Alt. Delay #2' | Normal | Alt. Delay #2 release |
| 173 | N/A | Alt. Delay #2 | One use | One-use Alt Delay #2 release |
| 175 | N/A | Alt. Delay #2 | Lockout | Lockout |
| 177 | N/A | Alt. Delay #2 | Double | Double Alt. Delay #2 release |
| 179 | N/A | Alt. Delay #2 | Normal | Alt. Delay #2 release |
| 191 | N/A | Toggle | Normal | Toggle release |
| 193 | N/A | Toggle | One use | One-use Toggle release |
| 195 | N/A | Toggle | Lockout | Lockout |
| 197 | N/A | Toggle | Double | Double Toggle release |
| 199 | N/A | Toggle | Normal | Toggle release |
| 311 | N/A | Default Delay | Normal | Default release |
| 313 | N/A | Default Delay | One use | One-use default release |
| 315 | N/A | Default Delay | Lockout | Lockout |
| 317 | N/A | Default Delay | Double | Double default release |
| 319 | N/A | Default Delay | Normal | Default release |
| 331 | N/A | Default Delay | Normal | Default release |
| 333 | N/A | Default Delay | One use | One-use default release |
| 335 | N/A | Default Delay | Lockout | Lockout |
| 337 | N/A | Default Delay | Double | Double default release |
| 339 | N/A | Default Delay | Normal | Default release |
| 351 | N/A | Alt. Delay #1 | Normal | Alt. Delay #1 release |
| 353 | N/A | Alt. Delay #1 | One use | One-use Alt. Delay #1 release |
| 355 | N/A | Alt. Delay #1 | Lockout | Lockout |
| 357 | N/A | Alt. Delay #1 | Double | Double Alt. Delay #1 release |
| 359 | N/A | Alt. Delay #1 | Normal | Alt. Delay #1 release |

TABLE 1b

| Function Code | Day/Night-Relay Code | Release Mode | Code Type | Actual Function |
|---|---|---|---|---|
| 371 | N/A | Alt. Delay #2 | Normal | Alt. Delay #2 release |
| 373 | N/A | Alt. Delay #2 | One use | One-use Alt Delay #2 release |
| 375 | N/A | Alt. Delay #2 | Lockout | Lockout |
| 377 | N/A | Alt. Delay #2 | Double | Double Alt. Delay #2 release |
| 379 | N/A | Alt. Delay #2 | Normal | Alt. Delay #2 release |
| 391 | N/A | Toggle | Normal | Toggle release |

TABLE 1b-continued

| Function Code | Day/Night-Relay Code | Release Mode | Code Type | Actual Function |
|---|---|---|---|---|
| 393 | N/A | Toggle | One use | One-use Toggle release |
| 395 | N/A | Toggle | Lockout | Lockout |
| 397 | N/A | Toggle | Double | Double Toggle release |
| 399 | N/A | Toggle | Normal | Toggle release |
| 511 | N/A | Default Delay | Normal | Default release |
| 513 | N/A | Default Delay | One use | One-use default release |
| 515 | N/A | Default Delay | Lockout | Lockout |
| 517 | N/A | Default Delay | Double | Double default release |
| 519 | N/A | Default Delay | Normal | Default release |
| 531 | N/A | Default Delay | Normal | Default release |
| 533 | N/A | Default Delay | One use | One-use default release |
| 535 | N/A | Default Delay | Lockout | Lockout |
| 537 | N/A | Default Delay | Double | Double default release |
| 539 | N/A | Default Delay | Normal | Default release |
| 551 | N/A | Alt. Delay #1 | Normal | Alt. Delay #1 release |
| 553 | N/A | Alt. Delay #1 | One use | One-use Alt. Delay #1 release |
| 555 | N/A | Alt. Delay #1 | Lockout | Lockout |
| 557 | N/A | Alt. Delay #1 | Double | Double Alt. Delay #1 release |
| 559 | N/A | Alt. Delay #1 | Normal | Alt. Delay #1 release |
| 571 | N/A | Alt. Delay #2 | Normal | Alt. Delay #2 release |
| 573 | N/A | Alt. Delay #2 | One use | One-use Alt Delay #2 release |
| 575 | N/A | Alt. Delay #2 | Lockout | Lockout |
| 577 | N/A | Alt. Delay #2 | Double | Double Alt. Delay #2 release |
| 579 | N/A | Alt. Delay #2 | Normal | Alt. Delay #2 release |
| 591 | N/A | Toggle | Normal | Toggle release |
| 593 | N/A | Toggle | One use | One-use Toggle release |
| 595 | N/A | Toggle | Lockout | Lockout |
| 597 | N/A | Toggle | Double | Double Toggle release |
| 599 | N/A | Toggle | Normal | Toggle release |
| 711 | N/A | Default Delay | Normal | Default release |
| 713 | N/A | Default Delay | One use | One-use default release |
| 715 | N/A | Default Delay | Lockout | Lockout |
| 717 | N/A | Default Delay | Double | Double default release |
| 719 | N/A | Default Delay | Normal | Default release |
| 731 | N/A | Default Delay | Normal | Default release |
| 733 | N/A | Default Delay | One use | One-use default release |

TABLE 1c

| Function Code | Day/Night-Relay Code | Release Mode | Code Type | Actual Function |
|---|---|---|---|---|
| 735 | N/A | Default Delay | Lockout | Lockout |
| 737 | N/A | Default Delay | Double | Double default release |
| 739 | N/A | Default Delay | Normal | Default release |
| 751 | N/A | Alt. Delay #1 | Normal | Alt. Delay #1 release |
| 753 | N/A | Alt. Delay #1 | One use | One-use Alt. Delay #1 release |
| 755 | N/A | Alt. Delay #1 | Lockout | Lockout |
| 757 | N/A | Alt. Delay #1 | Double | Double Alt. Delay #1 release |
| 759 | N/A | Alt. Delay #1 | Normal | Alt. Delay #1 release |
| 771 | N/A | Alt. Delay #2 | Normal | Alt. Delay #2 release |
| 773 | N/A | Alt. Delay #2 | One use | One-use Alt Delay #2 release |
| 775 | N/A | Alt. Delay #2 | Lockout | Lockout |
| 777 | N/A | Alt. Delay #2 | Double | Double Alt. Delay #2 release |
| 779 | N/A | Alt. Delay #2 | Normal | Alt. Delay #2 release |
| 791 | N/A | Toggle | Normal | Toggle release |
| 793 | N/A | Toggle | One use | One-use Toggle release |
| 795 | N/A | Toggle | Lockout | Lockout |
| 797 | N/A | Toggle | Double | Double Toggle release |
| 799 | N/A | Toggle | Normal | Toggle release |
| 911 | N/A | Default Delay | Normal | Default release |
| 913 | N/A | Default Delay | One use | One-use default release |
| 915 | N/A | Default Delay | Lockout | Lockout |
| 917 | N/A | Default Delay | Double | Double default release |
| 919 | N/A | Default Delay | Normal | Default release |
| 931 | N/A | Default Delay | Normal | Default release |
| 933 | N/A | Default Delay | One use | One-use default release |
| 935 | N/A | Default Delay | Lockout | Lockout |
| 937 | N/A | Default Delay | Double | Double default release |
| 939 | N/A | Default Delay | Normal | Default release |
| 951 | N/A | Alt. Delay #1 | Normal | Alt. Delay #1 release |
| 953 | N/A | Alt. Delay #1 | One use | One-use Alt. Delay #1 release |
| 955 | N/A | Alt. Delay #1 | Lockout | Lockout |

TABLE 1c-continued

| Function Code | Day/Night-Relay Code | Release Mode | Code Type | Actual Function |
|---|---|---|---|---|
| 957 | N/A | Alt. Delay #1 | Double | Double Alt. Delay #1 release |
| 959 | N/A | Alt. Delay #1 | Normal | Alt. Delay #1 release |
| 971 | N/A | Alt. Delay #2 | Normal | Alt. Delay #2 release |
| 973 | N/A | Alt. Delay #2 | One use | One-use Alt Delay #2 release |
| 975 | N/A | Alt. Delay #2 | Lockout | Lockout |
| 977 | N/A | Alt. Delay #2 | Double | Double Alt. Delay #2 release |
| 979 | N/A | Alt. Delay #2 | Normal | Alt. Delay #2 release |
| 991 | N/A | Toggle | Normal | Toggle release |
| 993 | N/A | Toggle | One use | One-use Toggle release |
| 995 | N/A | Toggle | Lockout | Lockout |
| 997 | N/A | Toggle | Double | Double Toggle release |
| 999 | N/A | Toggle | Normal | Toggle release |

Should neither a key closure, a data key 62, a mag card 64, nor a computer be detected, the microprocessor executes a test 142 to determine if one of the pushbuttons 84, 86, 88, 90 has been pressed and if so, which one. If the lock assembly 10 is in the locked state and the UNLOCK button 86 is pressed 141, a release signal is generated 143 to the drive unit 30 for releasing the latch 18. If the lock assembly 10 is in the unlocked state and the LOCK button 84 is pressed 145, a lock signal is generated 147 to the drive unit 30 for capturing the latch 18. Pressing the LOCK button 84 while the lock assembly 10 is secured or the UNLOCK button 86 while the lock assembly 10 is unsecured has no effect.

The microprocessor 92 may be programmed by the entry of a function code to enable a privacy mode. With the privacy mode enabled, pressing the LOCK button 84 instructs the microprocessor 92 to lockout the keypad 42, the data key reader 44 and the mag card reader 46. Entry of a valid code at the keypad 42 or by a data key 62 or a mag card 64 will not initiate generation of a release signal. Pressing the UNLOCK button 86 cancels the privacy mode, allowing normal operation of the lock controller 80 upon receipt of a valid code. Alternatively, the lock assembly 10 may include a position sensor 144 mounted in the door 12 that is activated by a magnet mounted in the door frame. Opening the door 12 activates the position sensor 144 to cancel the privacy mode. This ensures that the student is not accidentally locked out of the room if he does not manually cancel the privacy mode. The privacy mode may also be initiated or canceled by the use of lockout code, lockout data key or lockout mag card.

When the lock assembly 10' is installed with a mortise lock 28, as shown in FIG. 3, the lock assembly 10' may include a latch bolt position monitor 146. The lock controller 80 monitors the position of the latch bolt 18' via the position monitor 146 and automatically initiates the privacy mode whenever the latch bolt 18' is in the extended (latched) position and exits the privacy mode whenever the latch bolt 18' is in the retracted (unlatched) position. Alternatively, the lock assembly 10' may include a manual switch 148 for initiating and exiting the privacy mode.

The lock assembly 10 may utilize master data keys, master mag cards, programmer data keys, system data keys, system mag cards, user data keys and user mag cards. These devices may be programmed at a lock system. To program the master data keys, master mag cards, and programmer data keys, the programming cycle is initiated by depressing the INIT PROG button 90 three (3) times 150. The red LED 98 will come on to indicate that the lock controller 80 is in a programming mode. Each data key 62 and/or mag card is programmed by touching the data key 62 to a contact 66, 68 or sliding the magnetic strip 72 through the reader 46. If more than thirty (30) seconds elapses before another data key 62 or mag card 64 is programmed, the lock controller 80 will secure the programming cycle and revert to the normal cycle.

After each data key 62 or mag card 64 is programmed, the data that was programmed is checked to verify that the same data was not previously programmed into a different data key 62 or mag card 64. If the microprocessor 92 determines that non-unique data has been programmed into a subsequent data key or mag card, the programming cycle is canceled, and the green LED 100 flashes an error code.

System data keys and system mag cards may be programmed in a similar manner. The programming cycle is initiated by pressing and releasing the INIT PROG and CLR MEM buttons 90, 88 at the same time 152.

Since the lock assembly 10 does not use an external power source, the battery voltage is monitored and the lock controller 80 provides signals when the batteries approach the end of their useful life. The lock controller A/D converter 104 measures the battery voltage every time the lock is brought out of the sleep mode. When the battery voltage drops to a first predetermined level, a valid code entry will cause the red LED 98 to flash slowly nine (9) times before the microprocessor 92 generates a release signal. This indicates that there is a "low battery" condition and that the batteries should be changed.

If the users ignore this signal, the batteries will discharge to a second predetermined voltage level. This voltage level is selected to ensure that there is sufficient energy to unlock the lock at least one time. A valid code entry when the batteries are at this lower voltage level will cause the red LED 98 to flash quickly twelve times to indicate that there is a "low battery lockout" condition. While the batteries are at or below this voltage level, the microprocessor 92 will not generate a release signal unless a valid lockout code, lockout data key, or lockout mag card and a valid toggle code, toggle data key, or toggle mag card are used together to unlock the lock. The lockout code, lockout data key or lockout Mag Cared is used first to cancel the low battery lockout, and the toggle code, toggle data key or toggle mag card is used to release the lock. Since a toggle command causes the lock controller 80 to maintain the lock in an unlocked condition, the possibility that there will be insufficient power to unlock a secured lock is reduced. If the batteries are drained to a failure condition, the mechanical key override will unlock the lock.

The lock assembly 10 is secured by operating the motor 32 in the counterclockwise direction for a predetermined period of time. Conversely, the lock assembly 10 is unsecured by operating the motor 32 in a clockwise direction for the same predetermined period of time. Generally this period of time is set for either 250 or 500 milliseconds. The lock is released while in the secured state (and not in lockout) with the receipt of a valid release code from the keypad, a data key 62 or mag card 64. Lock release is indicated by flashing the green LED 100 during the relock delay period. When the relock delay period expires, the lock is secured, both LEDs 98, 100 are turned off, and the lock assembly 10 is placed in the sleep mode. The lock is toggled open while in the secured state (and not in lockout) with the receipt of a valid toggle code from the keypad, a data key 62 or mag card 64. The toggle open state is indicated by turning the green LED 100 on briefly while the motor 32 runs. The lock is toggled closed while in the unsecured state (and not in lockout) with the receipt of a valid toggle code from the keypad, a data key 62 or mag card 64. The lock assembly 10 is placed in a lockout mode by the receipt of a valid lockout code from the keypad 42, a data key or a mag card 64. Lockout freezes the lock assembly 10 in its current state. While the lock assembly 10 is in a lockout mode, the receipt of a valid release code or a valid toggle code will cause the red LED 98 to flash twelve times.

In summary, the lock controller 80 of the invention places the lock in an unlocked mode upon entry of a valid personal access code via the keypad 42, a programmable data key (data key) 62, a magnetic strip card (mag card) 64, or a combination of either a data key or a magnetic strip card and a personal identification number (PIN). In large systems employing large numbers of the stand alone lock system of the invention, each door user would be given either a mag card having a unique code and/or a unique numerical code to be entered at the keypad that would permit authorized entry through a particular number of doors. For security and other personnel that require access through all doorways, these personnel would be issued data keys or data keys and a unique PIN.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A door security system comprising:

latch means for latching a door;

lock operator means for selectively locking and unlocking said latch means;

an input console comprising:

first reader means comprising a key pad for receiving a personal access code;

second reader means comprising a card reader for receiving an electronic code from a coded card;

third reader means comprising a contact activatable data port for receiving an electronic code from a coded key;

controller means for controlling said operator means;

memory means for storing at least one valid personal access code and at least one valid personal identification number; and processor means communicating with said memory means, said first reader means, said second reader means, said third reader means, and said lock controller means, for processing data received from at least one of said first, second or third reader means in response to detecting inputs at said first, second or third reader means, said processing means comprising:

identification means for identifying an access code input at one of said first, second or third reader means;

code comparison means for comparing said access code to at least one valid access code stored in said memory means, said code comparison means generating a first permissive signal in response to a positive comparison;

linked attribute determination means responsive to said first permissive signal for determining whether a linked attribute must also be entered at said keypad, said linked attribute determination means generating a release signal if a linked attribute is not required, said linked attribute determination means generating a second permissive signal if a linked attribute is required;

query means responsive to said second permissive signal for querying said keypad for a personal identification number;

PIN comparison means for comparing said personal identification number to at least one valid personal identification number stored in said memory means, said PIN comparison means generating said release signal in response to a positive comparison; wherein said lock controller means is responsive to said release signal.

2. The door security system of claim 1 further comprising key operated override means coupled to said lock operator means for overriding the lock status of the door.

3. The door security system of claim 1 wherein said processor means further comprises:

LRC receiving means for receiving a longitudinal redundancy check signal from the coded card;

LRC calculator means for providing a calculated longitudinal redundancy check signal for the coded card;

LRC comparison means for comparing the longitudinal redundancy check signal of the LRC receiving means to the calculated longitudinal redundancy check signal, said LRC comparison providing a third permissive signal to said code comparison means in response to a positive comparison.

4. The door security system of claim 1 wherein said processor means further comprises expiration determination means for determining whether or not the access code has expired, said expiration determination means generating a fourth permissive signal to said linked attribute determination means in response to a determination that the access code has not expired.

5. The door security system of claim 4 wherein said processor means further comprises master code determination means for determining whether the access code is a master code, said master code determination means providing a programming permissive signal to said processor means if the access code is a master code, said master code determination means providing a fifth permissive signal to said expiration determination means if the access code is not a master code.

6. The door security system of claim 1 wherein said processor means further comprises combination comparison means for comparing a combination of said access code and said personal identification number to combinations of access codes and personal identification numbers stored in said memory means.

7. The door security system of claim 1 further comprising a lock button and an unlock button, said lock button locking said latch means when pressed if said latch means is unlatched, and said unlock button unlocking said latch means when pressed if said latch means is locked.

8. The door security system of claim 1 further comprising a lock button and an unlock button, said lock button generating a privacy mode when pressed wherein said first, second and third reader means are locked-out, said unlock button canceling said privacy mode when pressed.

9. The door security system of claim 8 further comprising means for automatically canceling said privacy mode when the door is opened.

10. The door security system of claim 1 wherein said processor means further comprises:

CRC receiving means for receiving a cyclic redundancy check signal from the coded key;

CRC calculator means for providing a calculated cyclic redundancy check signal for the coded key;

CRC comparison means for comparing the cyclic redundancy check signal of the CRC receiving means to the calculated cyclic redundancy check signal, said CRC comparison providing a sixth permissive signal to said code comparison means in response to a positive comparison.

* * * * *